United States Patent
Chu et al.

(10) Patent No.: US 9,024,893 B2
(45) Date of Patent: May 5, 2015

(54) CONTROLLING SYSTEM AND A CONTROLLING METHOD OF A TOUCH PANEL, AND A STYLUS PEN FOR APPLYING TO THE TOUCH PANEL

(75) Inventors: Chun-Hsueh Chu, Hsinchu (TW); Jui-Jung Chiu, Zhudong (TW)

(73) Assignee: TPK Touch Solutions Inc., Taipei (TW)

( * ) Notice: Subject to any disclaimer, the term of this patent is extended or adjusted under 35 U.S.C. 154(b) by 60 days.

(21) Appl. No.: 13/596,052

(22) Filed: Aug. 28, 2012

(65) Prior Publication Data

US 2013/0057491 A1    Mar. 7, 2013

(30) Foreign Application Priority Data

Sep. 6, 2011  (CN) .......................... 2011 1 0262622

(51) Int. Cl.
*G06F 3/041* (2006.01)
*G06F 3/0354* (2013.01)
*G06F 3/044* (2006.01)

(52) U.S. Cl.
CPC .......... *G06F 3/03545* (2013.01); *G06F 3/0416* (2013.01); *G06F 3/044* (2013.01); *G06F 2203/04106* (2013.01)

(58) Field of Classification Search
CPC . G06F 3/03545; G06K 9/222; G06K 7/10603
USPC ................... 345/173, 174, 179; 178/18.03
See application file for complete search history.

(56) References Cited

U.S. PATENT DOCUMENTS

| | | | | | |
|---|---|---|---|---|---|
| 5,251,123 | A | * | 10/1993 | Reiffel et al. | 700/56 |
| 5,528,002 | A | * | 6/1996 | Katabami | 178/19.06 |
| 7,612,767 | B1 | * | 11/2009 | Griffin et al. | 345/179 |
| 2005/0162411 | A1 | | 7/2005 | Berkel Van | |
| 2006/0097991 | A1 | * | 5/2006 | Hotelling et al. | 345/173 |
| 2006/0158440 | A1 | | 7/2006 | Ashenbrenner | |
| 2010/0085325 | A1 | * | 4/2010 | King-Smith et al. | 345/174 |
| 2010/0252335 | A1 | * | 10/2010 | Orsley | 178/18.03 |
| 2012/0068964 | A1 | * | 3/2012 | Wright et al. | 345/174 |
| 2013/0021291 | A1 | * | 1/2013 | Kremin et al. | 345/174 |

FOREIGN PATENT DOCUMENTS

CN            101498967        8/2009

* cited by examiner

*Primary Examiner* — Kathy Wang-Hurst
*Assistant Examiner* — Peijie Shen
(74) *Attorney, Agent, or Firm* — Gokalp Bayramoglu

(57) ABSTRACT

A controlling system of a touch panel comprises of a drive signal generating circuit, a sensing module for sensing a waveform signal from the touch panel, and a signal processing module for enabling and disabling the drive signal generating circuit based on the signal outputted by the sensing module. Therefore, the mentioned controlling system can support the active and the passive touch modes. In addition, the present invention further provides a controlling method of the touch panel and a stylus pen applied to the mentioned controlling system.

16 Claims, 4 Drawing Sheets

US 9,024,893 B2

CONTROLLING SYSTEM AND A CONTROLLING METHOD OF A TOUCH PANEL, AND A STYLUS PEN FOR APPLYING TO THE TOUCH PANEL

This Application claims the benefit of the People's Republic of China Application No. CN201110262622.8, filed on Sep. 6, 2011.

FIELD OF THE INVENTION

The present disclosure relates to a controlling system, a controlling method, and a stylus pen, and more particularly to a system and a method for controlling a touch panel, and a stylus pen for use on the touch panel.

DESCRIPTION OF THE RELATED ART

Many electronic devices such as computers, automatic selling machines, etc, have various types of input devices. These input devices obtain users' behaviors in view of different sensing methods. For instance, a traditional keyboard depends on a mechanical operation to realize switches, and a user can exert pressure on the switches to input a signal.

Many types of devices also contain display devices or monitors connected to a host apparatus when used. Usually, information being displayed on a display device is upgraded as soon as user inputs the data, instructions or some other information. For instance, information sent through a computer keyboard is displayed on a computer monitor.

In some devices, a display device and a user input device are implemented by an integrated monitor. These types of devices are usually known as touch screen equipments. Currently, touch mode of a touch screen belongs to a passive touch mode. As far as projected capacitive touch screen technology is concerned, controlling system of the touch screen is used to generate drive signals to the touch screen. When a user uses fingers or a conductive object such as a passive stylus pen directly on the touch screen panel, charges in electrode array of the touch screen would change. The controlling system of the touch screen can determine actual positions of touch points by sensing the differences in sensing signals of an electrode array.

However, touch operations performed by using the fingers cannot be operated accurately by the users. Although a passive stylus pen can compensate for inefficiency of a finger-touching operation, the controlling system for the pen, would be worse in terms of sensitivity of touch sensing due to the fact that contact area of a passive stylus pen is often smaller than that of a finger.

Thus, there exists a need for a proper controlling system that improves defects existing in passive touch methods (finger or a stylus pen) to achieve advantages such as high-sensitivity and accurate input.

SUMMARY OF THE INVENTION

In view of the above-mentioned situations, the present disclosure relates to a stylus pen capable of emitting sine wave signals actively and designing a control system, which is capable of switching channels. Thus, the present disclosure can implement an operating system for supporting an active touch mode and a passive touch mode, thereby achieving high-sensitivity and accurate inputs.

Control system of a touch panel comprises a drive signal generating circuit, a sensing module for sensing a waveform signal from the touch panel, and a signal processing module that selectively enables and disables the chive signal generating circuit based on the output signal by the sensing module.

The signal processing module of the control system of the touch panel can enable and disable the drive signal generating circuit based on the output signal by the sensing module, and can then conduct a corresponding touch mode operation. Thus, the above-mentioned control system can support an active and a passive touch mode.

The sensing module further comprises a first sensing unit that is electrically connected to a plurality of first axial conductive lines of a touch panel, and a second sensing unit that is electrically connected to the first axial conductive lines and a plurality of second axial conductive lines of the touch panel. Therein, the first axial conductive lines and the second axial conductive lines are mutually insulated and intersected.

Further, the signal processing module comprises a switching unit which is electrically connected to the first sensing unit and the second sensing unit, and an analog-to-digital converter that is electrically connected to the switching unit. The switching unit selectively outputs the signal generated by the first sensing unit and the second sensing unit according to a switching signal. The analog-to-digital converter converts the signal output by the switching unit from an analog signal to a digital signal.

The signal processing, module can further comprise of a determining module that is used for determining characteristics of signals generated by the first sensing unit and the second sensing unit, and a controlling unit that is used for generating the switching signal and controlling enabling and disabling operation of the drive signal generating circuit based on determining result of the determining module. The controlling unit further determines positions of touch points on the touch panel based on the signal generated by the first sensing unit or the second sensing unit.

Further, the first sensing unit comprises of a first multiplexer that is electrically connected to a touch panel, an integrator that is electrically connected to the first multiplexer, and a sampling and holding circuit that is electrically connected to the integrator. The first multiplexer is used for selecting any one of the first axial conductive lines. The integrator is used for converting the waveform signal to a first direct current voltage signal. The sample-holding circuit is used for sampling and holding the voltage level of the first direct current voltage signal.

Further, the second sensing unit comprises a second multiplexer that is electrically connected to a touch panel, an amplifier that is electrically connected to the second multiplexer, and a frequency mixer that is electrically connected to the amplifier. The second multiplexer is used for selecting any one of the first axial conductive lines and the second axial conductive lines. The amplifier is used for amplifying the waveform signal. The frequency mixer is used for converting the amplified waveform signal to a second direct current voltage signal.

Further, the determining module comprises of a level detector that is electrically connected to the first sensing unit, and a frequency detector that is electrically connected to the second sensing unit. The level detector is used for detecting voltage value of the first direct current voltage signal, and the frequency detector is used for detecting frequency of the second direct current voltage signal.

When the level detector detects voltage value of the first direct current voltage signal to be higher than a defined level within a first period of time, the controlling unit enables the drive signal generating circuit and controls the switching unit for selectively outputting the first direct current voltage signal. Further, when the frequency detector detects frequency of the second direct current voltage signal to be higher than a frequency count within a second period of time, the controlling unit disables the drive signal generating circuit and controls the switching unit selectively outputting the second direct current voltage signal.

The second sensing unit comprises a second multiplexer that is electrically connected to the touch panel, an amplifier that is electrically connected to the second multiplexer, and a peak detector that is electrically connected to the amplifier. The second multiplexer is used for selecting any one of the first axial conductive lines and the second axial conductive lines. The amplifier is used for amplifying the waveform signal. The frequency mixer is used for detecting the amplified waveform signal for forming a second direct current voltage signal.

The determining module comprises a first level detector that is electrically connected to the first sensing unit, and a second level detector that is electrically connected to the second sensing unit. The first level detector is used for detecting voltage value of the first direct current voltage signal, and the second level detector is used for detecting voltage value of the second direct current voltage signal.

Further, when the first level detector detects voltage value of the first direct current voltage signal to be higher than a first level within a first period time, the controlling unit enables the drive signal generating circuit and controls the switching unit that selectively outputs the first direct current voltage signal. When the second level detector detects voltage value of the second direct current voltage signal to be higher than a second level within a second period of time, the controlling unit disables the chive signal generating circuit and controls the switching, unit that selectively outputs the second direct current voltage signal, wherein the second level is higher than the first level.

The controlling unit presets the drive signal generating circuit and controls the switching unit to selectively output the signal generated by the first sensing unit.

The determining module is designed by adopting a time-division multiplexing, operation.

The controlling unit further generates a switching signal based on an external signal, wherein priority weight of the external signal is higher than the determining result determined by the determining module.

A controlling method of a touch panel comprises: sensing a waveform signal from the touch panel through a sensing path; and enabling and disabling generation of a drive signal transmitted to the touch panel based on the signal outputted by the sensing, path.

The above-mentioned controlling method of the touch panel can enable and disable a drive signal based on the signal outputted by the sensing path, and then conduct corresponding touch mode operation. Thus, the above-mentioned controlling method can support the active touch mode and the passive touch mode.

The step of sensing the waveform signal further comprises: sensing a waveform signal of a plurality of first axial conductive lines on the touch panel in sequence through a first sensing path; and sensing a waveform signal of the first axial conductive lines and a plurality of second axial conductive lines on the touch panel in sequence through a second sensing path, wherein the first axial conductive lines and the second axial conductive lines are mutually insulated and intersected.

The controlling method further comprises: presetting to enable of the generation of the drive signal, and further enabling and disabling generation of the drive signal based on the signal outputted by the first sensing path and the second sensing path.

The controlling method further comprises: presetting for selectively outputting the signal outputted by the first sensing path, and further selectively outputting the signal outputted by the first sensing path or the second sensing path based on the signal outputted by the first sensing path and the second sensing path.

The controlling method further comprises: converting the signal, outputted either by the first sensing path or the second sensing path, from an analog signal to a digital signal; and determining position of touch points on the touch panel based on the converted digital signal.

When voltage value of a signal outputted by the first sensing path is higher than a defined level within a first period of time, enabling to generate the drive signal. In such a case, signal outputted by the first sensing path is selectively given as output. On the other hand, when the frequency of the signal outputted by the second sensing, path is higher than a frequency count within a second period of time, disabling to generate the drive signal, and signal outputted by the second sensing path is selectively given as output.

Further, when voltage value of a signal outputted by the first sensing path is higher than a first level within a first period of time, enabling to generate the drive signal. In such a case, signal outputted by the first sensing path is selectively given as output. On the other hand, when voltage value of the signal outputted by the second sensing path is higher than a second level within a second period of time, disabling to generate the drive signal, and signal outputted by the second sensing path is selectively given as output, wherein the second level is higher than the first level.

A stylus pen comprises: a main body and a pen nib part which is disposed on one end of the main body. The pen nib part is designed with conductive materials. The main body includes a sine wave signal generator, wherein the sine wave signal generator generates a sine wave signal according to voltage, and transmits the sine wave signal to a touch panel through the pen nib part, when applied on the touch panel.

The above-mentioned stylus pen may generate a sine wave signal, which is used as an active stylus pen. The pen nib part of the stylus pen comprises of conductive materials and can be used as a passive stylus pen when the stylus pen does not generate the sine wave signal. Therefore, the above-mentioned stylus pen can operate, both, actively and passively on to the touch panel.

Further, the sine, wave signal generator is a voltage-controlled oscillator.

The main body of the stylus pen further comprises of a power circuit which is electrically connected to the sine wave signal generator for generating the voltage.

Further, the power circuit includes a voltage source and a voltage converter, wherein the voltage converter is electrically connected to the voltage source. The voltage converter is used for adjusting the level of voltage provided by the voltage source.

The stylus pen further includes a power switch, wherein the power switch is electrically connected to a power circuit and a sine wave signal generator. The power switch is used for turning on and off the voltage outputted by the power circuit.

DETAILED DESCRIPTION OF THE PREFERRED EMBODIMENTS

The following description is integrated with the drawings to illustrate the embodiments of the present disclosure.

Figure 1:
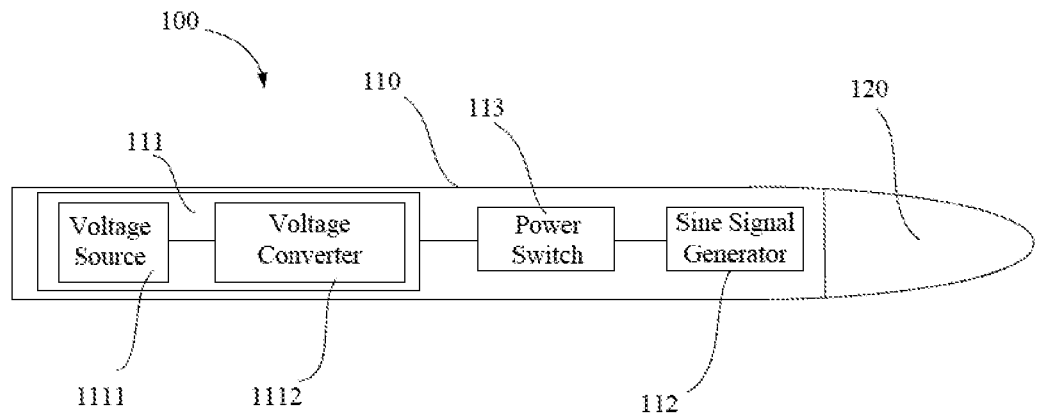
FIG. 1 is a schematic structural block diagram of an embodiment of a stylus pen according to the present disclosure.

FIG. 1 shows a schematic diagram of an embodiment of a stylus pen according to the present disclosure. As depicted, the stylus pen 100 of the present embodiment is applied to a touch panel and includes a main body 110 and a pen nib part 120. For illustrations, the touch panel is designed as a projected capacitive touch panel. The main body 110 is represented as a hollow cylinder. The pen nib part 120 is represented as a conoid and is disposed on one end of the main body 110. In a practical design, the whole or partial part of the pen nib part 120 comprises of conductive materials such as conductive rubber, metal, metal oxide, and alloy etc. Thus, when a user is operating the stylus pen 100, the conductive material in the pen nib part 120 is used for contacting the touch panel so as to form the touched condition. In the present embodiment, the top end of the pen nib part 120 is designed by the conductive materials.

Further, the main body 110 comprises a power circuit 111 and a sine wave signal generator 112. The power circuit 111 further comprises a voltage source 1111, and a voltage converter 1112 that is electrically connected to the voltage source 1111. The voltage source 1111 includes batteries such as lithium batteries, alkaline batteries, etc., for providing voltage. The voltage converter 1112 is used for adjusting the level of voltage provided by the voltage source 1111 based on the practical design requirement. The sine wave signal generator 112 is electrically connected to the power circuit 111 and also to the conductive materials within the pen nib part 120. The sine wave signal generator 112 generates a sine wave signal based on the voltage outputted by the power circuit 111 and transmits the sine wave signal to the touch panel (not shown) through the pen nib part 120. In the present embodiment, the sine wave signal generator 112 is, illustratively, designed as a voltage-controlled oscillator, and is used for generating 1 MHz, 5V sine wave signal.

Moreover, the main body 110 further comprises a power switch 113 which is electrically connected in between the power circuit 111 and the sine wave signal generator 112, and is used for turning on and of the voltage outputted by the power circuit 111. Thus, when a user turns on the power switch 113, the stylus pen 100 can be used as an active stylus pen for generating sine wave signal actively to the touch panel, However, if a user turns of the power switch 113, the stylus pen 100 can be used as a passive stylus pen for simulating user's finger to touch the touch panel.

Figure 2:
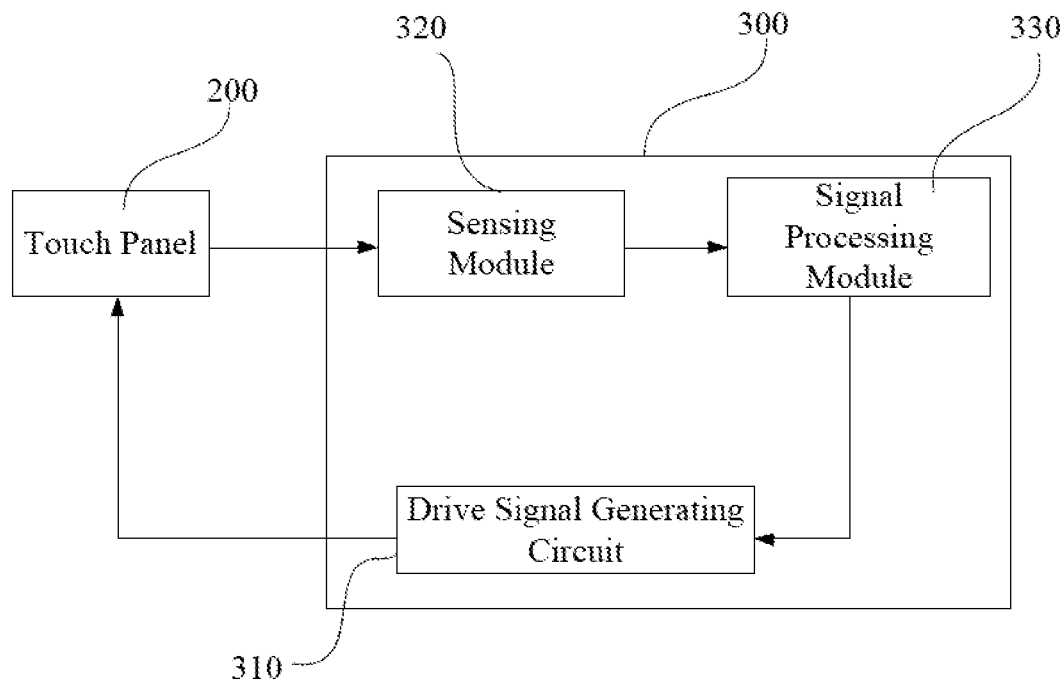
FIG. 2 is a schematic block diagram of an embodiment of a controlling system of a touch panel according to the present disclosure.

FIG. 2 shows a schematic block diagram of an embodiment of a controlling system of a touch panel according to the present disclosure. As depicted, the controlling system 300 of the present embodiment is used for sensing a touch panel 200 and determining the exact touch points when a user touches the touch panel 200. The touch panel 200 comprises of a plurality of first axial conductive lines and a plurality of second axial conductive lines, wherein the first axial conductive lines and the second axial conductive lines are mutually insulated and intersected so as to form a sensing electrode array. In the present embodiment, the first axial and the second axial conductive lines are represented orthogonally, wherein the first and second axial conductive lines are located on the X and Y axis, respectively. The controlling system 300 comprises of a drive signal generating circuit 310, a sensing module 320, and a signal processing module 330. The drive signal generating circuit 310 is electrically connected to the signal processing module 330 and the second axial conductive line of the touch panel 200, and is preset for being controlled by the signal processing module 330 to continuously generate a drive signal for offering to each of the second axial conductive lines in a sequence. In a specific design, the drive signal generating circuit 310 can be used for generating a drive signal with 250 KHz, 3V, and further offering the drive signal to each of the second axial conductive lines in the sequence through a switching operation using a multiplexer.

The sensing module 320 is electrically connected to the touch panel 200, and is used for sensing a waveform signal from the touch panel 200. The signal processing module 330 electrically connects to the sensor module 320 and further determines Whether to enable or disable the drive signal generating circuit 310 based on the signal outputted by the sensing module 320. Moreover, the signal processing module 330 can calculate the positions where capacitance changes in the sensing electrode array based on the signal outputted by the sensing module 320 so as to determine actual positions of the touch points.

Figure 3:
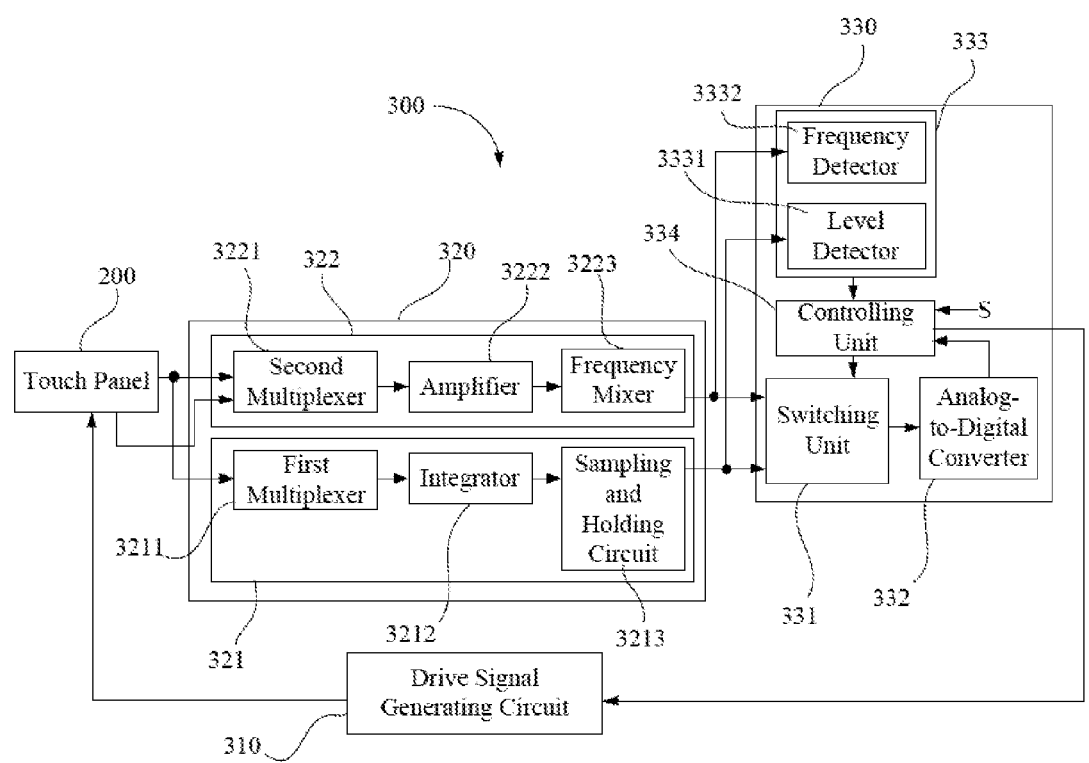
FIG. 3 is a schematic block diagram of the controlling system in accordance with the preferred embodiment as shown in FIG. 2.

FIG. 3 shows a schematic block diagram in accordance with the preferred embodiment of the controlling system as shown in FIG. 2. The sensing module 320 of the present embodiment comprises a first sensing unit 321 and a second sensing unit 322 so as to forum a dual-channel design. The first sensing unit 321 electrically connects to the first axial conductive lines of the touch panel 200, and the second sensing unit 322 electrically connects to the first and the second axial conductive lines of the touch panel 200. Since the controlling system 300 determines relative positions of touch points on the touch panel 200 by means of the coordinate signals in the two axes X and y, the controlling system 300 of the present embodiment can support not only the passive touch mode but the active touch mode through the design of the dual-channel paths in the sensing module 320. More specifically, in the passive touch mode, the controlling system 300 takes the drive signal generated from the second axial conductive lines and the waveform signal sensed from the first axial conductive lines as the coordinate signals of the two axes; whereas in the active touch mode, the drive signal is made from the sine wave signal generated by an active stylus pen (not shown) and the controlling unit 300 takes the waveform signal sensed from the first and the second axial conductive lines as the coordinate signals of the two axes. Moreover, due to different frequencies and voltage strengths of signals generated by the drive signal generating circuit 310 and the active stylus pen, the controlling system 300 can distinguish signals and switch for forming different touch modes.

The first sensing unit 321 further comprises a first multiplexer 3211 electrically connected to the touch panel 200, an Integrator 3212 electrically connected to the first multiplexer 3211, and a sampling and holding circuit 3213 electrically connected to the integrator 3212. The first multiplexer 3211 is used for switching and selecting the first axial conductive lines in sequence. The integrator 3212 is used for converting the waveform signal sensed from the first axial conductive line to a first direct current voltage signal. The sampling and holding circuit 3213 is used for sampling and holding the voltage level of the first direct current voltage signal. Practical designs may further include a circuit connected to the rear end of the integrator 3212 such as an amplifier for raising voltage levels to meet the requirement of determining levels.

The second sensing unit 322 comprises of a second multiplexer 3221 electrically connected to the touch panel 200, an amplifier 3222 electrically connected to the second multiplexer 3221, and a frequency mixer 3223 electrically connected to the amplifier 3222. The second multiplexer 3221 is used for switching and selecting any one of the first and the second axial conductive lines in a sequence. The amplifier 3222 is used for amplifying the waveform signal sensed from the first axial conductive line or the second axial conductive line. The frequency mixer 3223 is used for converting the amplified waveform signal to a second direct current voltage signal. Since the frequency mixer 3223 conducts the frequency conversion processing of the waveform signal with a reference frequency, the second direct current voltage signal still belongs to the waveform signal. Moreover, in practical design, the second direct current voltage signal outputted by the frequency mixer 3223 can further be filtered by a low pass filter (not shown) to attain required quality of the signal.

The signal processing module 330 further comprises of a switching unit 331 electrically connected to the first sensing unit 321 and the second sensing unit 322, an analog-to-digital converter 332 electrically connected to the switching unit 331, a determining module 333 electrically connected to the first sensing unit 321 and the second sensing unit 322, and a controlling unit 334, which is electrically connected to the switching unit 331, the analog-to-digital converter 332, and to the determining module 333. The switching unit 331 selectively outputs the signal outputted by the first sensing unit 321 or the second sensing unit 322 based on a switching signal. The analog-to-digital converter 332 is used for converting the signal outputted by the switching unit 331 from an analog signal to a digital signal. The determining module 333 is used for determining characteristic of signals generated by the first sensing unit 321 and the second sensing unit 322. The above-mentioned characteristic could be a frequency or voltage strength of a direct current voltage signal, which is in fact dependant on designs of the first sensing unit 321 and the second sensing unit 322. Since the first sensing unit 321 in the present embodiment is designed primarily with the integrator 3212 and the sampling and holding circuit 3213, readable characteristic of the first direct current voltage signal is the voltage strength. Similarly, since the second sensing unit 322 is designed primarily with the frequency mixer 3223, readable characteristic of the second direct current voltage signal can either be the frequency or the voltage strength.

As above-mentioned, the determining module 333 further comprises of a level detector 3331 and a frequency detector 3332. The level detector 3331 is electrically connected to the first sensing unit 321 and is used for detecting the voltage values of the first direct current voltage signal outputted by the sampling and holding circuit 3213. The frequency detector 3331 is electrically connected to the second sensing unit 322 and is used for detecting the frequency of the second direct current voltage signal outputted by the frequency mixer 3223. Since the readable characteristic of the second direct current voltage signal can either be the frequency or the voltage strength, the determining module 333 can include another one level detector (not shown) to replace the frequency detector 3331, which is further used for detecting voltage value of the second direct current voltage signal outputted by the frequency mixer 3223.

Next, the controlling unit 334 belongs to a digital signal processor (DSP), and is used for generating a switching signal in accordance with the determining result of the determining module 333 so as to control the switching status of the switching unit 331 and to enable and disable the drive signal generating circuit 310. Based on the operation design of the controlling system 300, the controlling unit 334 is preset to enable the drive signal generating circuit 310 and to control the switching unit 331 for selectively outputting the signal generated by the first sensing unit 321. More specifically, by default, the controlling system 300 is set in a passive touch mode, and when an active stylus pen comes in contact with the touch panel 200, the controlling system 300 is set changed to an active touch mode. Further, when a counting time is reached after the active stylus pen has departed from the touch panel 200, the controlling system 300 reverts to the preset passive touch mode.

For further description, the determining module 333 is designed by adopting, a time-division multiplexing (TDM) operation which outputs the determining result to the controlling unit 334. Illustratively, when a level detector 3331 detects voltage value of a first direct current voltage signal to be higher than a defined level within a first period of time, the determining module 333 outputs the determining result on behalf of the passive touch mode, for instance, logical signal "0", and therefore the controlling unit 334 is set in a default state, which continuously enables the drive signal generating circuit 310 and controls the switching unit 331 for selectively outputting the first direct current voltage signal. When a frequency detector 3332 detects frequency of the second direct current voltage signal to be higher than a frequency count within a second period of time, the determining module 333 outputs the determining result on behalf of the active touch mode, for instance, logical signal "1", and therefore the controlling unit 334 disables the drive signal generating circuit 310 and controls the switching unit 331 for selectively outputting the second direct current voltage signal. Furthermore, if the time of the frequency detector 3332 cannot detect the second direct current voltage signal reaches the counting time, the frequency detector 3332 stops outputting the determining result on behalf of the active touch mode, and as a result the controlling unit 334 will revert to the preset passive touch mode. The long and short times related to the above-mentioned first period of time, second period of time, and counting time can be adjusted based on the demands of the actual design, which are not limited by the present embodiment.

Finally, besides enabling and disabling the drive signal generating circuit 310 and generating the switching signal to control the switching status of the switching unit 331, the controlling unit 334 is further used to determine actual positions of touch points on the touch panel 200 based on the signal generated either by the first sensing unit 321 or the second sensing unit 322.

According to another embodiment, the controlling unit 334 of the controlling system 300, besides generating the switching signal according to the determining result of the determining module 333 to form the type of automatically switching the touch modes, can further generate a switching signal according to an external signal S. The external signal S has higher priority weight when compared to the determining result of the determining module 222. In addition, the external signal S can be triggered by a button (such as a hardware switch button) or a software interface, thereby allowing a user to operate manually. As a result, the controlling, system 300 can further support manual switching of the touch modes.

Figure 4:
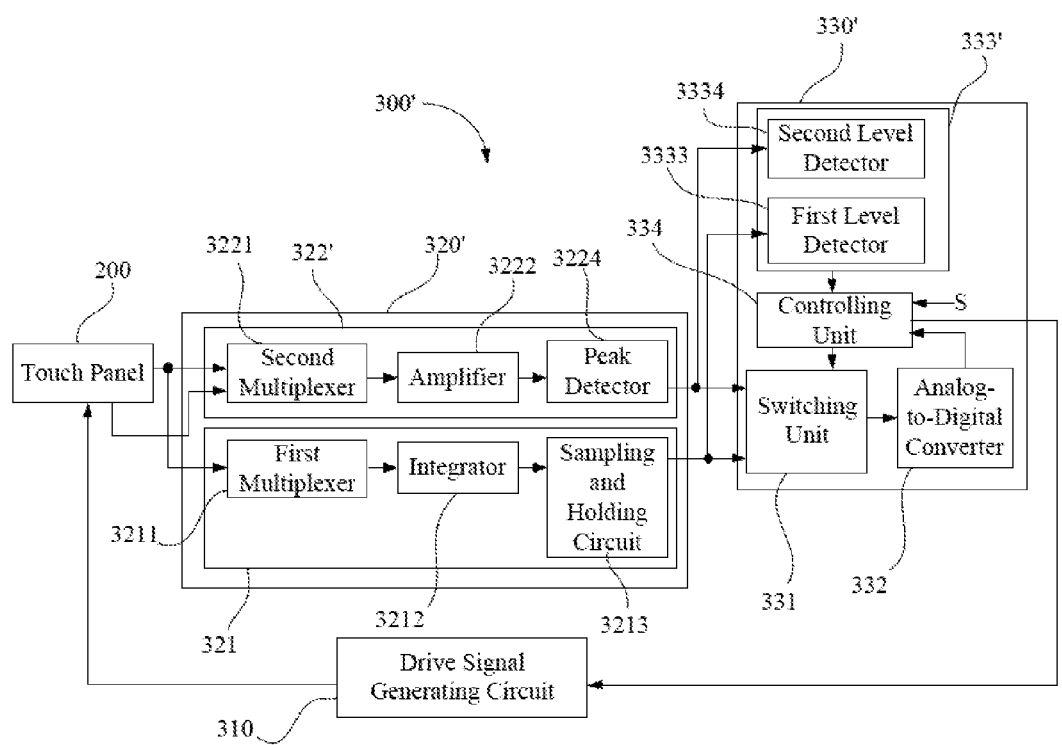
FIG. 4 is a schematic block diagram of another preferred embodiment of the controlling system as shown in FIG. 2.

FIG. 4 shows a schematic block diagram in accordance with another preferred embodiment of the controlling system as shown in FIG. 2. Architecture of a controlling system 300' is similar to FIG. 3. The point of difference being in the circuit architecture of a second sensing unit 322' in a sensing module 320' and a determining module 333' in a signal processing module 330'. The second sensing unit 322' comprises of a second multiplexer 3221 electrically connected to a touch panel 200, an amplifier 3222 electrically connected to the second multiplexer 3221, and a peak detector 3224 electrically connected to the amplifier 3222. The second multiplexer 3221 is used for switching and selecting any one of the first axial conductive lines and the second axial conductive lines in a sequence. Amplifier 3222 is used for amplifying the waveform signal of the touch panel 200 sensed either from the first axial conductive line or from the second axial conductive line. The peak detector 3224 is used for detecting the peak values of the amplified waveform signal amplified by the amplifier 3222 to form a second direct current voltage signal. Thus, the readable characteristic of the first direct current voltage signal outputted by the first sensing unit 321 and the second direct current voltage signal outputted by the second sensing unit 322' are all voltage strengths.

The corresponding determining module 333' comprises of a first level detector 3333 and a second level detector 3334. The first level detector 3333 electrically connects to the first sensing unit 321, and is used for detecting voltage value of the first direct current voltage signal outputted by the sampling, and holding, circuit 3213. The second level detector 3334 electrically connects to the second sensing unit 322', and is used for detecting voltage value of the second direct current voltage signal outputted by the peak detector 3224.

Therefore, when the first level detector 3333 detects voltage value of the first direct current voltage signal to be higher than a first level within a first period of time, the determining module 333' outputs the determining result on behalf of the passive touch mode. Thus, the controlling unit 334 is set in a default state, which continuously enables the chive signal generating circuit 310 and controls the switching unit 331 for selectively outputting the first direct current voltage signal. However, when the second level detector 3334 detects the voltage value of the second direct current voltage signal to be higher than a second level within a second period of time, the determining module 333' outputs the determining result on behalf of the active touch mode. Therefore, the controlling unit 334 disables the drive signal generating circuit 310 and controls the switching unit 331 for selectively outputting the second direct current voltage signal, wherein the second level is designed to be higher than the first level.

Figure 5:
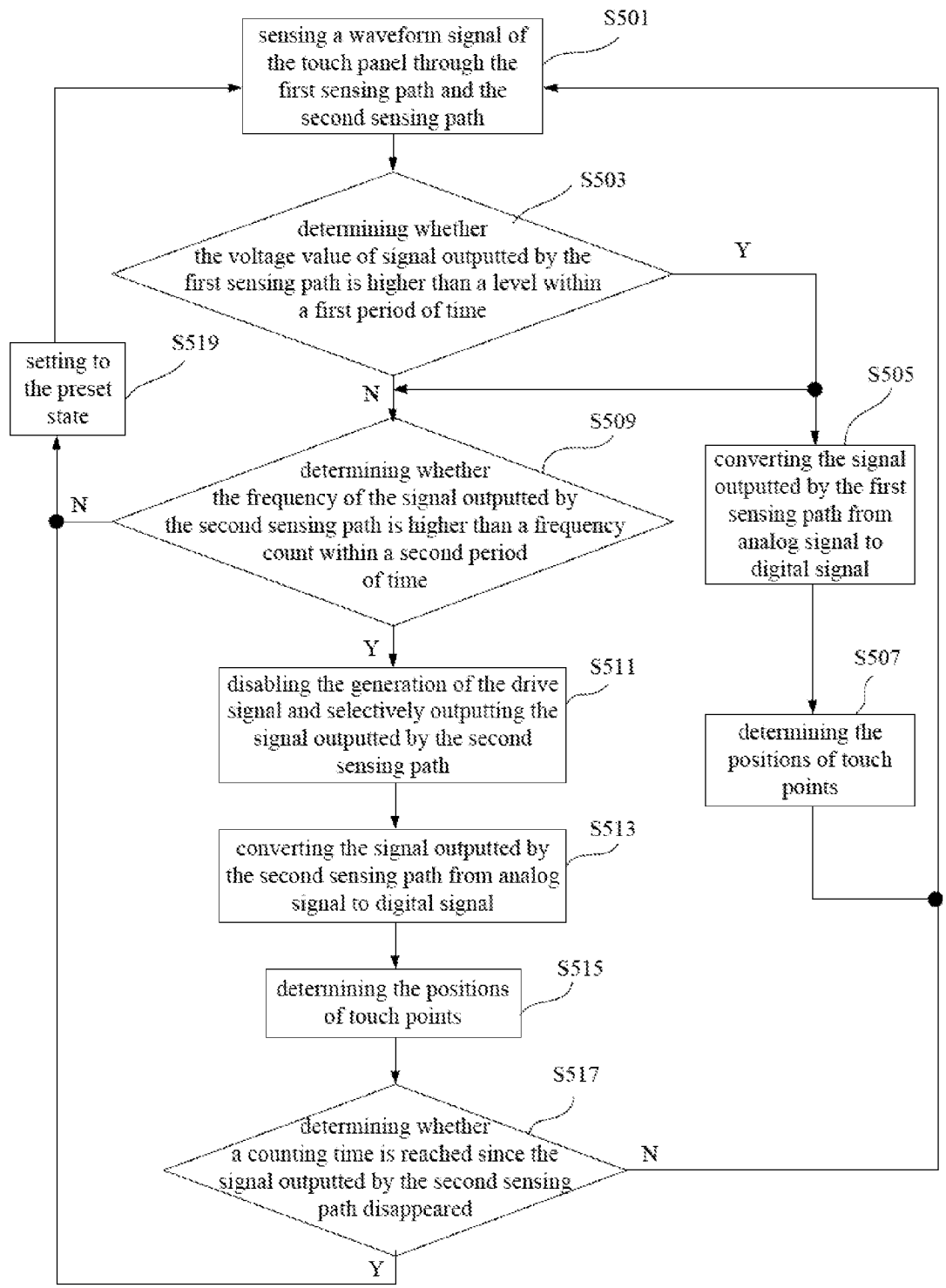
FIG. 5 is a flowchart that shows a controlling method of a touch panel according to the present disclosure.

FIG. 5 shows a flowchart of a controlling method of a touch panel according to the present disclosure. The controlling method is applied to a controlling system that uses a first sensing path and a second sensing path for sensing the touch panel, wherein the first sensing path is electrically connected to a plurality of first axial conductive lines of the touch panel, and the second sensing path is electrically connected to the mentioned first axial conductive lines and a plurality of second axial conductive lines on the touch panel. Moreover, the controlling method is preset to enable generation of a drive signal and selectively outputting the signal outputted by the first sensing path.

As shown in FIG. 5, the controlling method comprises the steps of: Step S501, which senses a waveform signal of the touch panel through the first sensing path and the second sensing path. The first sensing path is used for sensing the waveform signal of the first axial conductive line on the touch panel in sequence, and the second sensing path is used for sensing the waveform signal of the first axial and the second axial conductive lines on the touch panel in sequence.

Next, the executing step S503 determines whether or not voltage value of a signal outputted by the first sensing path is higher than a defined level within a first period of time. Since the default of the present embodiment is to enable the generation of the drive signal and selectively output the signal of the first sensing path, the initial determining result in Step S503 is usually a YES, thereby being in a passive touch mode. Step S505 converts the signal outputted by the first sensing path from an analog signal to a digital signal. Step S507 determines position of touch points contacted by a user on the touch panel based on the converted digital signal. After step S507 is executed, subsequent procedures from step S501 are repeated again.

Moreover, if the determining result of step S503 is a NO, a user can operate under an active touch mode and use an active stylus pen to touch the touch panel. At this moment, due to frequency and voltage strength of the sine wave signal generated by the active stylus pen differing from the drive signal, step S509 is executed. S509 determines whether or not the frequency of the signal outputted by the second sensing path is higher than a frequency count within a second period of time. If the determining result of step S509 is a YES, it represents that the sine wave signal generated by the active stylus pen is identified as a result step S511 is executed to disable the generation of the chive signal and selectively output the signal outputted by the second sensing path. Next, step S513 converts the signal outputted by the second sensing path from an analog signal to a digital signal. Step S515 determines the position of touch points by touching the touch panel with an active stylus pen based on the converted digital signal.

Subsequently, due to generation of the drive signal having been disabled under the active touch mode, step S517 is executed to further determine whether or not a counting time is reached since the signal outputted by the second sensing path is disappeared. If the determining result of step S517 is a YES, it represents that the counting time is reached since a user stopped touching the touch panel with the active stylus pen. Thus, step S519 is executed, wherein the controlling system will be set to revert to the preset state and become a passive touch mode. To restart enabling the generation of the drive signal and be in the state of selectively outputting the signal outputted by the first sensing path, step S501 and the subsequent procedures will be executed again. If the determining result of step S517 is a NO, a user continuously touches the touch panel by using the active stylus pen to operate under the active touch mode, thus returning to step S501 to sense the waveform signal generated by the touch panel through the first sensing path and the second sensing path, and executing the subsequent procedures.

Since the present embodiment adopts time-division multiplexing to design, even if the determining result of step S503 is a YES, the determining step of step 509 would be executed along with step S505 at the same time. If the generated drive signal under the passive touch mode makes the determining result of step S509 a NO, step S519 will be executed to make the controlling system return to the preset state, wherein, the controlling system is under the original passive touch mode and continuously enables generation of a drive signal and is set in the state of selectively outputting the signal outputted by the first sensing path. Similarly, if no other factors influence and change the active touch mode, step S511 disables generation of the drive signal, and if the determining result of step S517 is a NO, step S501 and the subsequent steps are executed, wherein the sine wave signal generated by the active stylus pen will make the determining result of step S503 a NO and step S509 a YES, thereby controlling the system under the active touch mode.

Another embodiment of the controlling method further comprises a design for determining the signal outputted by the second sensing path (the step corresponds to step S509 in FIG. 5). The determination can further be made by determining whether or not the voltage value of the second sensing path is higher than a defined level within a second period of time, which further determines setting of the controlling system to the active touch mode or not. Illustratively, the controlling method of the present embodiment enables and disables generation of the drive signal by determining voltage value of the signal outputted by the first and the second sensing paths, and makes the decision of selectively outputting the signal by the first sensing path or the second sensing path. Specifically, when the voltage value of the signal outputted by the first sensing path is higher than the first level within the first period of time, generation of the drive signal is enabled and the signal outputted by the first sensing path is outputted selectively, whereas when the voltage value of the signal outputted by the second sensing path is higher than the second level within the second period of time, generation of the drive signal is disabled and the signal outputted by the second sensing path is outputted selectively. Therein, the second level designed in the present embodiment is higher than the first level.

To sum up, the stylus pen of the present disclosure can be an active stylus pen for generating a sine wave signal actively, and the controlling system can be an operating system that supports the active and the passive touch modes. Therefore, the present disclosure can achieve the advantages of having high-sensitivity, inputting accurately, and providing handwriting situations.

While certain embodiments have been shown and described, various modifications and substitutions may be made thereto without departing from the spirit and scope of the disclosure. Therefore, it is to be understood that the present disclosure has been described by way of illustration and not limitations.

What is claimed is:

1. A controlling system of a touch panel, comprising:
   a drive signal generating circuit;
   a sensing module sensing a waveform signal from the touch panel, wherein the sensing module further comprises a first sensing unit electrically connected to a plurality of first axial conductive lines on the touch panel and comprises a second sensing unit electrically connected to the first axial conductive lines and a plurality of second axial conductive lines on the touch panel, wherein the first axial conductive lines and the second axial conductive lines are mutually insulated and intersected; and
   a signal processing module enabling and disabling the drive signal generating circuit based on the signal outputted by the sensing module, wherein the signal processing module comprises a switching unit electrically connected to the first sensing unit and the second sensing unit, and the signal processing module comprises an analog-to-digital converter electrically connected to the switching unit, wherein the switching unit selectively outputs signals generated by the first sensing unit and the second sensing unit based on a switching signal, and wherein the analog-to-digital converter converts signal generated by the switching unit from an analog signal to a digital signal and wherein the signal processing module further comprises:
   a determining module determining characteristic of signals outputted by the first sensing unit and the second sensing unit; and
   a controlling unit generating the switching signal and controlling the enabling and disabling operation of the drive signal generating circuit based on a determining result of the determining module, and determining location of touch points on the touch panel based on the signal generated by either the first sensing unit or the second sensing unit.

2. The controlling system of the touch panel according to claim 1, wherein the first sensing unit comprises:
   a first multiplexer electrically connected to the touch panel;
   an integrator electrically connected to the first multiplexer; and
   a sampling and holding circuit electrically connected to the integrator, wherein the first multiplexer selects any one of the first axial conductive lines, and wherein the integrator converts the waveform signal to a first direct current voltage signal, and wherein the sampling and holding circuit samples and holds voltage level of the first direct current voltage signal.

3. The controlling system of the touch panel according to claim 1, wherein the second sensing unit comprises:
   a second multiplexer electrically connected to the touch panel;
   an amplifier electrically connected to the second multiplexer; and
   a frequency mixer electrically connected to the amplifier, wherein the second multiplexer selects any one of the first axial conductive lines and the second axial conductive lines, and wherein the amplifier amplifies the waveform signal, and wherein the frequency mixer converts the amplified waveform signal to a second direct current voltage signal.

4. The controlling system of the touch panel according to claim 3, wherein the determining module comprises:
   a level detector electrically connected to the first sensing unit; and
   a frequency detector electrically connected to the second sensing unit, wherein the level detector detects voltage value of the first direct current voltage signal, and wherein the frequency detector detects frequency of the second direct current voltage signal.

5. The controlling system of the touch panel according to claim 4, wherein the controlling unit enables the drive signal generating circuit and controls the switching unit for selectively outputting the first direct current voltage signal when the level detector detects that the voltage value of the first direct current voltage signal is higher than a defined level within a first period of time, and wherein the controlling unit disables the drive signal generating circuit and controls the switching unit for selectively outputting the second direct current voltage signal when the frequency detector detects that frequency of the second direct current voltage signal is higher than a frequency count within a second period of time.

6. The controlling system of the touch panel according to claim 2, wherein the second sensing unit comprises:
   a second multiplexer electrically connected to the touch panel;
   an amplifier electrically connected to the second multiplexer; and
   a peak detector electrically connected to the amplifier, wherein the second multiplexer selects any one of the first axial conductive lines and the second axial conductive lines, and wherein the amplifier amplifies the waveform signal, and wherein the peak detector detects a peak value of the amplified waveform signal for forming a second direct current voltage signal.

7. The controlling system of the touch panel according to claim 6, wherein the determining module further comprises:
   a first level detector electrically connected to the first sensing unit; and
   a second level detector electrically connected to the second sensing unit, wherein the first level detector detects voltage value of the first direct current voltage signal, and wherein the second level detector detects the voltage value of the second direct current voltage signal.

8. The controlling system of the touch panel according to claim 7, wherein the controlling unit enables the drive signal generating circuit and controls the switching unit for selectively outputting the first direct current voltage signal when the first level detector detects the voltage value of the first direct current voltage signal is higher than a first level within a first period of time, and wherein the controlling unit disables the drive signal generating circuit and controls the switching unit for selectively outputting the second direct current voltage signal when the second level detector detects voltage value of the second direct current voltage signal is higher than a second level within a second period of time, and wherein the second level is higher than the first level.

9. The controlling system of the touch panel according to claim 1, wherein the controlling unit is preset to enable the drive signal generating circuit and control the switching unit for selectively outputting the signal generated by the first sensing unit.

10. The controlling system of the touch panel according to claim 1, wherein the determining module is designed by adopting time-division multiplexing operation.

11. The controlling system of the touch panel according to claim 1, wherein the controlling unit further generates the switching signal based on an external signal, and wherein priority weight of the external signal is higher than the determining result of the determining module.

12. A controlling method of a touch panel, comprising of:
   sensing a waveform signal from the touch panel through a sensing path;
   enabling and disabling generation of a drive signal transmitted to the touch panel based on the signal outputted by the sensing path, wherein the step of sensing the waveform signal further comprises sensing a waveform signal of a plurality of first axial conductive lines on the touch panel in sequence through a first sensing path; and
   sensing a waveform signal of the first axial conductive lines and a plurality of second axial conductive lines on the touch panel in sequence through a second sensing path, wherein the first axial conductive lines and the second axial conductive lines are mutually insulated and intersected;
   presetting to enable generation of the drive signal; and
   enabling and disabling the generation of the drive signal based on the signal outputted by the first sensing path and the second sensing path.

13. The controlling method of the touch panel according to claim 12, further comprising:
   presetting for selectively outputting the signal outputted by the first sensing path; and
   selectively outputting the signal outputted by the first sensing path or the second sensing path according to the signal outputted by the first sensing path and the second sensing path.

14. The controlling method of the touch panel according to claim 13, further comprising:
   converting the signal outputted by the first sensing path or the second sensing path from analog signal to digital signal; and
   determining location of touch points on the touch panel based on the digital signal.

15. The controlling method of the touch panel according to claim 13, further comprising:
   enabling generation of the drive signal and selectively outputting the signal outputted by the first sensing path when voltage value of the signal outputted by the first sensing path is higher than a defined level within a first period time; and
   disabling generation of the drive signal and selectively outputting the signal outputted by the second sensing path when frequency of the signal outputted by the second sensing path is higher than a frequency count within a second period of time.

16. The controlling method of the touch panel according to claim 13, further comprising:
   enabling generation of the drive signal and selectively outputting the signal outputted by the first sensing path when voltage value of the signal outputted by the first sensing path is higher than a first level within a first period of time; and
   disabling generation of the drive signal and selectively outputting the signal outputted by the second sensing path when voltage value of the signal outputted by the second sensing path is higher than a second level within a second period of time, wherein the second level is higher than the first level.

* * * * *